Aug. 19, 1958    J. M. GWINN, JR    2,848,122
ELEVATING TAILGATE AND CONTROLS THEREFOR
Filed Feb. 2, 1955    8 Sheets-Sheet 6

INVENTOR.
Joseph M. Gwinn, Jr
BY
Harness, Dickey & Pierce
ATTORNEYS.

Aug. 19, 1958     J. M. GWINN, JR     2,848,122
ELEVATING TAILGATE AND CONTROLS THEREFOR
Filed Feb. 2, 1955     8 Sheets-Sheet 8

INVENTOR.
Joseph M. Gwinn, Jr.
BY
Harness, Dickey & Pierce
ATTORNEYS

United States Patent Office 2,848,122
Patented Aug. 19, 1958

2,848,122

ELEVATING TAILGATE AND CONTROLS THEREFOR

Joseph M. Gwinn, Jr., Dearborn, Mich., assignor to Gar Wood Industries, Inc., Wayne, Mich., a corporation of Michigan Application February 2, 1955, Serial No. 485,721

19 Claims. (Cl. 214—77)

This invention relates to hydraulically controlled devices and more particularly to hydraulically controlled elevating tailgate assemblies for vehicles.

The present improvements are particularly directed to platform assemblies adapted both to transport loads between the bed of a vehicle and the ground and to serve as a tailgate. To these ends, the platform is adapted to be moved primarly in translation between a lower substantially horizontal ground-level position and an upper substantially horizontal bed-level position, and the platform is further adapted to be rotated from that upper horizontal position to a vertical position in which its face is perpendicular to the bed and encloses the rear of the vehicle body.

To accomplish the aforesaid motion in translation, a form of parallelogrammatic mechanism can be employed, comprising a pair of rigid, effectively parallel arms pivotally associated with the tailgate and with a support structure. It has, however, proved difficult to devise satisfactory means for lowering the tailgate under power without subjecting the structure to undue strain when the tailgate engages the ground or some other obstacle.

Difficulties have also been met in attempting to adapt the parallelogrammatic mechanism to perform the additional function of rotating the tailgate between its open and closed positions. Commercially, this additional facility is attained in various ways, one expedient being to render one of the two equi-length legs of the parallelogrammatic parallelism extensible so that it may be elongated relative to the other to rotate the tailgate between its open and closed position. Practical use has indicated a need for improvement.

It has also been found in practice that many of the prior art devices have failed to incorporate adequate provision to prevent damage to the equipment due to overloading and to prevent injury to the operator.

It is therefore an object of this invention to improve the rigidity, the accuracy and consistency of performance and the operational safety of a hydraulically operated elevating tailgate assembly.

Another object of the invention is to improve the control capabilities of a hydraulic valve and of mechanism for controlling a hydraulic valve.

A feature of this invention is an improved adjustable mounting means for accommodating an elevating tailgate assembly to vehicles of various sizes.

Another feature of this invention is an improved modified parallelogrammatic mechanism in which the pivotal axis of one of the constituent arms is selectably shiftable.

Another feature of this invention is an improved rotatable control mechanism for rotating one of two coaxial shafts and for selectably rotating the other shaft.

A further feature of this invention is an improved elevating tailgate control mechanism wherein the tailgate may either be lowered under power or may be permitted to descend under the influence of gravitational forces, the rate of descent being regulated.

Another feature of this invention is an improved means for defining each of a plurality of operative positions of a hydraulic control valve.

A further feature of this invention is a hydraulic control valve incorporating improved safety features.

The manner of attainment of the foregoing objects, the nature of the foregoing features, and other objects and features of the invention, will be perceived from the following detailed description of embodiments of the invention when read with reference to the accompanying drawings in which.

In order that an appreciation of the nature and operation of the disclosed embodiment of the invention may be obtained preparatory to a detailed description of its parts, the apparatus will be generally described with reference to Figs. 1 to 4 of the drawings. While the inventive principles have general applicability, the shown equipment is adapted to be associated with a vehicle such as a truck including a bed 10, having an upper surface 12, supported upon suitable frame members such as the channel sections 14 and 16 represented in phantom in Fig. 1 of the drawings. Since except for the valve assembly 18, the total equipment is substantially bilaterally symmetrical about the center line of the hydraulic cylinder 20, a portion of the structure which would appear to the right of Fig. 1 has not been represented since it would be but a reversed duplicate of the structure shown in the left-hand half of Fig. 1.

The tailgate 22, fragmentarily represented in partial section, is a rigidly internally braced sheet-metal member supported by a pair of outer arms 24, but one of which is shown, and a center arm 26. Each of these arms is pivotally mounted about one of its ends by structural members attached to a support tube weldment 28 which, in turn, is rigidly supported upon the vehicle. The outer arms 24 cannot be moved in translation relative to the support tube 28 except during adjustment. The center arm 26, however, may be so moved since it is pinned to a pair of links 30 which are rotatable relative to mounting plates 32, integral with the support tube 28.

Movement of the tailgate 22 is controlled by a cylinder assembly 20 rotatably mounted about its upper end upon the mounting plates 32 and acting through the center arm 26, and is also controlled by a pair of latch assemblies 34 (but one of which may be seen in the drawings) cooperating with individual latch pins 36 integral with the outer arms 24. Either one of a pair of hand lever assemblies 38, but one of which is shown, may be manually actuated to control, through mechanical linkage, the latch assemblies 34 and to control, via the valve assembly 18, the cylinder 20.

The outer arms 24 and the center arm 26 are pivotally associated with the tailgate 22. The location of the pivotal axes 60 and 94 of the other ends of these arms is such that the arms operate, over a portion of their total motion, in a modified parallelogrammatic movement. Thus, with the tailgate assembly in the position shown in Figs. 1 and 2 of the drawings, if the piston rod 40 is retracted by the cylinder 20, the center arm 26 is forced to rotate about its pivot pin 94, carrying the tailgate 22 and the outer arms 24 into the position represented in Fig. 3 of the drawings in which the latch pins 36 are engaged by the latch assemblies 34 and in which the tailgate 22 extends horizontally and in substantial coplanarity with the upper surface 12 of the bed 10 of the truck with which the apparatus is associated. The forces are such that throughout this motion the links 30 remain in the position shown in Fig. 2.

Figure 3:
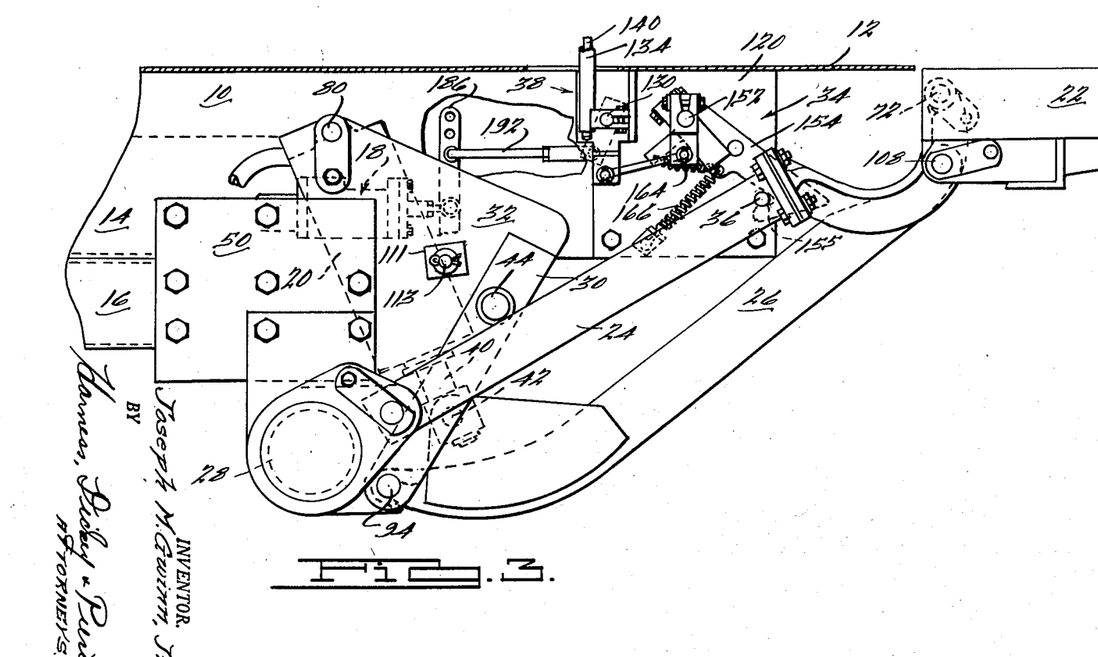
Fig. 3 is a reproduction of the view of Fig. 2 except that the tailgate has been elevated to a position in which its upper surface is coplanar with the surface of the bed of the truck.
Figure 4:
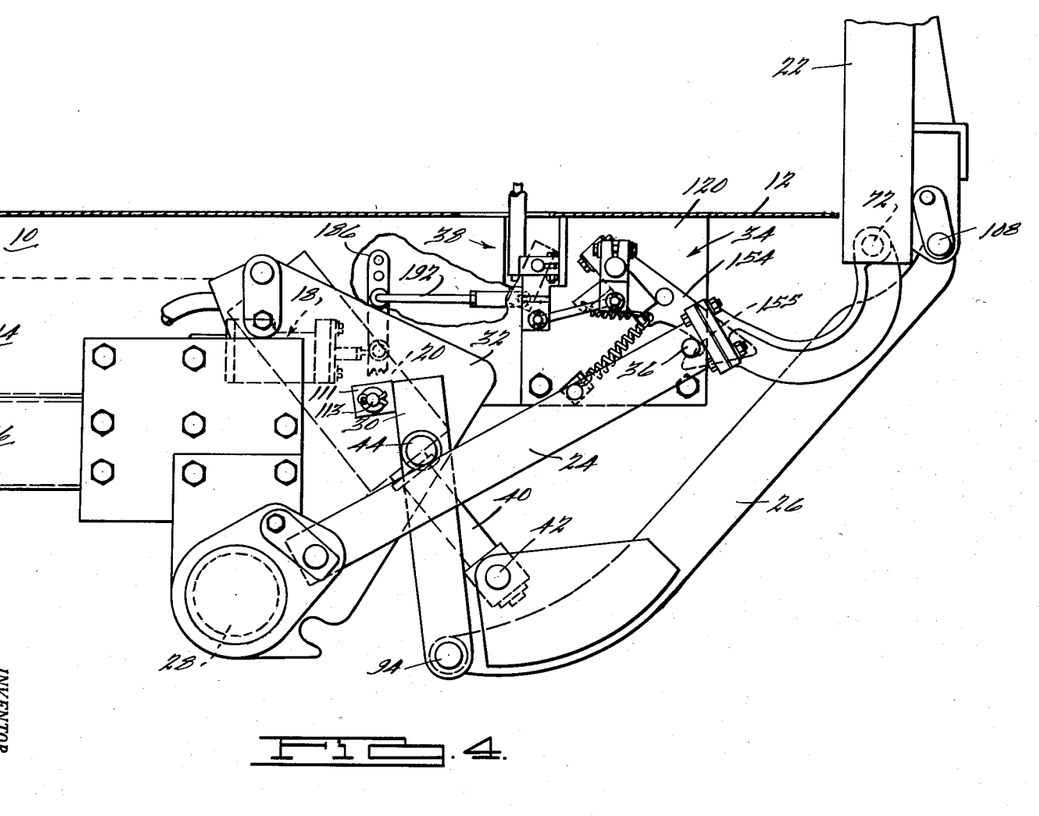
Fig. 4 is a reproduction of the views of Figs. 2 and 3 except that the tailgate has been rotated into its closed position.

In this Fig. 3 position of the apparatus, downward motion of the outer arms 24 is prevented by the latching mechanisms 34. Therefore, if the piston rod 40 is forced outwardly by the cylinder 20, the resultant forces will cause the links 30 to be rotated about their pivot pin 44, carrying the center arm 26 therewith so that the tailgate 22 is rotated into the closed position represented in Fig. 4 of the drawings.

Subsequent retraction of the piston rod 40 by the cylinder 20 will cause the tailgate 22 to be rotated back to the position of Fig. 3.

Figure 2:
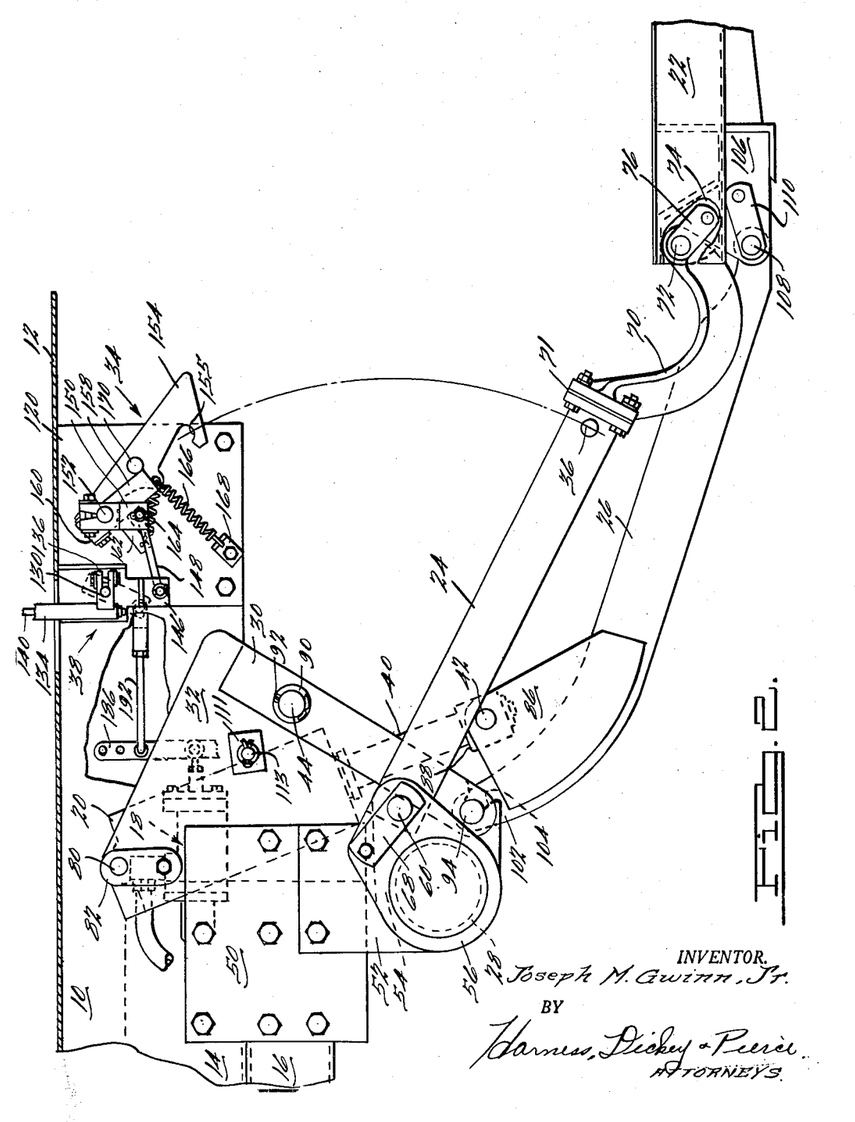
Fig. 2 is a side elevational view of the structure shown in Fig. 1 with the parts bearing the same inter-relationship as they did in Fig. 1.

Lowering of the tailgate 22 from the position shown in Fig. 3 to the position shown in Fig. 2 may be accomplished either gravitationally or under power. Thus, with the hand lever 38 moved to one position, the latch assembly 34 is released and the hydraulic system is so controlled that the tailgate 22 may slowly descend solely as a result of its own weight coupled with the weight of any load it may be carrying until it strikes the ground or some other obstacle. In a different position of the hand lever assemblies 38, not only are the latch assemblies 34 released but also the cylinder 20 is caused to force the piston rod 40 outwardly so that the lowering of the tailgate 22 from the position shown in Fig. 3 to the position shown in Fig. 2 is accomplished under power.

Figure 1:
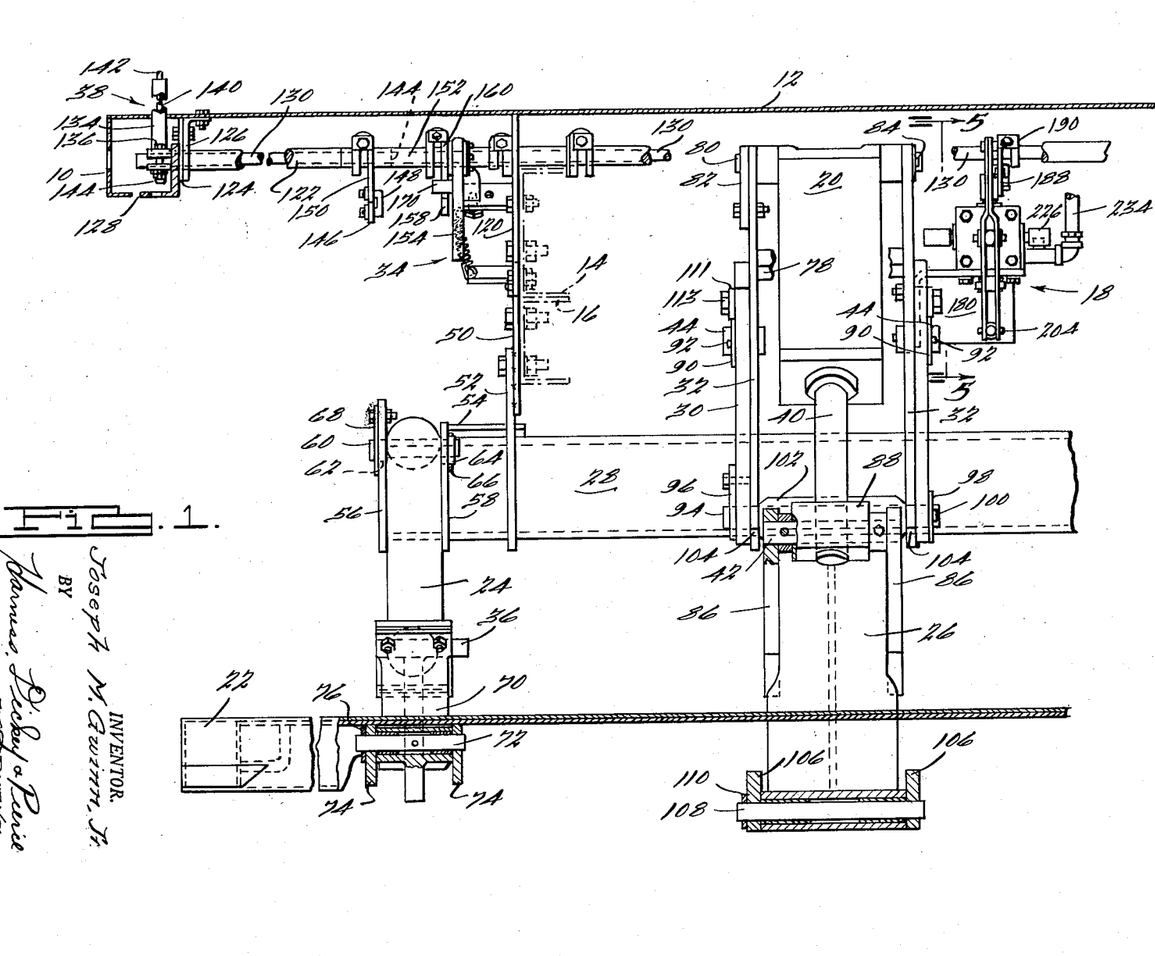
Figure 1 is an elevational view of a tailgate elevating assembly, embodying the principles of the invention, as viewed from the rear of the vehicle with which the equipment is associated and with the tailgate in its lowered position, certain of the elements being shown in section, others being partially cut away to improve the clarity of presentation, and other duplicate parts being omitted from the representation to avoid redundancy and possible confusion.

Considering now the structure in more detail, with particular reference to Figs. 1 and 2 of the drawings, the major operating elements including arms 24 and 26, the cylinder assembly 20 and the valve assembly 18, are supported on the vehicle by means of a pair of mounting plates 50 (but one of which is shown) bolted or otherwise affixed to a portion of the truck frame, e. g., to the channel-section frame members 14 and 16. Each mounting plate 50 in turn supports a mounting plate 52 which is circularly apertured to accept the support tube weldment 28. Proper initial positioning can be achieved and relative rotation prevented by keying the support tube 28 to the mounting plate 52 by welding a bar 54 upon the upper surface of the support 28 and providing a slot at one point in the aperture in the mounting plate 52 engageable with that bar. It is desirable that the support tube 28 be initially freely slidable within the apertures in the mounting plates 52 to permit the equipment to be accommodated to vehicles having various frame widths, and it will be noted that many of the other elements of the total apparatus are similarly adjustable. After installation, the support tube may be welded to the mounting plates 52, if desired, to prevent relative motion between those elements. It will be noted that tube 28 serves only a support function and therefore its configuration is not critical; it need not be circular in cross section nor need it be cylindrical.

Each end of the support tube 28 is capped by an end plate 56, and a mounting plate 58 is spaced therefrom along the tube 28. Plates 56 and 58 are provided with aligned apertures to accept a pivot pin 60 for each of the outer arms 24. It may be desirable to provide for a selectable degree of departure from true parallelogrammatic operation of the apparatus, such as to cause the tailgate 22 to be horizontal when elevated but slightly tilted when lowered to facilitate loading. To achieve this faculty, the pivotal mounting for the outer arms 24 may be made eccentric by providing an enlarged eccentric shoulder 62 (Fig. 1) upon the pin 60 engaging the aperture in the end plate 56 and by providing an eccentric bushing 64 engaging the aperture in the mounting plate 58, the bushing 64 being fastened to the pin 60 in a position of eccentricity corresponding to that of the shoulder portion 62 by means of a cotter pin 66. Rotation of the pin 60 relative to the plates 56 and 58 is prevented by means of a pin-locking plate 68 integral with the pin 60 and bolted to the end plate 56 in a position established by the requisite extent of the departure from true parallelogrammatic operation.

The end of each of the outer arms 24 is apertured to engage an individual one of the pins 60, suitable bushings being inserted therebetween. Each of the outer arms 24 comprises a tubular arm terminating in a hook portion 70, a latch pin 36 projecting inwardly of the outer arm 24 at a point to the rear of the hook portion 70. The end of the hook 70 is apertured to engage a pivot pin 72 which is supported by a pair of bearing plates 74 welded or otherwise affixed to the tailgate 22 and is held therein by a pin-locking plate 76. Initial adjustment of the equipment can be accomplished by inserting shims 71 between the outer arm body 24 and the hook portion 70.

The cylinder assembly 20 is conventional in form. Its piston rod 40 is moved outwardly or retracted in accordance with the pressure differential existing between the two sides of a double-acting piston (not shown), as established by the valve assembly 18 in a manner hereinafter to be described.

The cylinder assembly 20 is pivotally mounted about its upper end upon a pivot pin 80 extending through apertures in cylinder mounting plates 32 and retained in position by means of a pin locking plate 82 and a cotter pin 84. The two cylinder mounting plates 32 are mounted in spaced parallelism with each other upon the support tube weldment 28 and may be additionally interjoined by an angle iron 78.

In order to associate the piston rod 40 with the center arm 26, a pair of cylinder attaching plates 86 is welded or otherwise affixed to the sides of the box-section body portion of the center arm 26. A pin 42 engages aligned apertures in the two cylinder attaching plates 86 and is engaged by a clevis 88 rigidly attached to the piston rod 40.

Each of the cylinder mounting plates 32 is provided with an outwardly extending stud 44 serving as a journal for an individual one of a pair of links 30. Each link 30 is retained upon its stud 44 by means of a washer 90 and cotter pin 92. A shaft 94 extends through aligned apertures near the lower ends of the two links 30 and is retained in position therein by a pin-locking plate 96 (Fig. 1) at one end and a washer 98 and cotter pin 100 at the other. The pin-locking plate 96 is similar in configuration and function to the pin-locking plates 76 and 82 previously described and has not been represented in the side view of Fig. 2 in order to avoid confusion in the representation.

Shaft 94 supports and serves as a pivotal axis for the center arm 26, the end 102 of which is apertured to accept that shaft and is sufficiently narrow to pass between the two cylinder mounting plates 32. Each of the cylinder mounting plates 32 is provided with a tapered notch 104 to accept the ends of the shaft 94.

The other end of the center arm 26 is journaled in a pair of bearing plates 106, integral with the tailgate 22, by means of a pin 108, suitable sleeve bearings being provided. The pin 108 may be retained in place by means of a pin-locking plate 110.

Thus, each of the arms 24 and 26 is pivotally mounted with respect to the support tube 28 and pivotally supports the tailgate 22. At all times that the journal 94 for the center arm 26 is in engagement with the notches 104 in the cylinder mounting plates 32, the relationships are such that a modified parallelogrammatic action occurs whereby the upper surface of the tailgate 22 remains substantially horizontal during the motion of the tailgate from its lowered to its raised position, or vice versa. This is exemplarily accomplished by so orienting the parts (Fig. 2) that the plane defined by the longitudinal axes of the outer arm journals 60 and the center arm journal 94 is approximately parallel to the plane defined by the longitudinal axes of the pins 72 and 108, and the plane defined by the longitudinal axes of the outer arm pivots 60 and 72 is approximately parallel to the plane defined by the longitudinal axes of the center-arm pivots 94 and 108. As a result, while the physical arms 24 and 26 do not appear to be parallel, their effective axes are approximately parallel throughout the entire range of movement of the tailgate 22 between its lowered to its raised position.

To move the tailgate 22 from the position represented in Fig. 2 to the position represented in Fig. 3, the cylinder assembly 20 is caused to retract the piston rod 40. Since the pivot pin 42 interjoining piston rod 40 and center arm 26 is laterally offset (Fig. 2) from the plane defined by the longitudinal axes of the cylinder pivot pin 80 and the center-arm pivot pin 94, retraction of piston rod 40 will produce a moment causing center arm 26 to be rotated about its pivot 94. Extension of the piston rod 40 will similarly produce a lowering of the tailgate 22.

It will be noted that the longitudinal axis of the center-arm pivot 94 is laterally offset to the left (Fig. 2) of the longitudinal axis of the piston rod 40 so that no force is exerted during either retraction or extension of piston rod 40 tending to move pivot pin 94 to the right out of engagement with notches 104 nor any moment tending to rotate links 30 in a counterclockwise direction about their pivotal axes 44, as long as the outer arms 24 are not latched. Conversely, the weight distribution is such as to retain pin 94 in notches 104 during either elevation or lowering of the tailgate 22: the pivotal axis 94 of the center arm 26 is effectively fixed during these operations.

When tailgate 22 approaches the position represented in Fig. 3, latch pins 36 cam the latches 154 aside and enter the notches 155 therein. Until these latches 154 are released, operation of cylinder assembly 20 can only produce rotation of the tailgate to its open or closed position.

To rotate tailgate 22 from the open position (Fig. 3) to the closed position (Fig. 4), cylinder assembly 20 is caused to extend the piston rod 40. Since outer arms 24 are latched into relative immobility, the tailgate-end of the center arm 26 cannot move downwardly, and, hence, a moment is exerted causing links 30 to rotate about their pivots 44 in a counterclockwise direction to move pin 94 out of notches 104 and to thereby so shift the position of the tailgate-end of center arm 26 and pivot pin 108 that tailgate 22 is rotated to its closed position. A reverse action occurs when piston rod 40 is retracted.

The closed (Fig. 4) position of the tailgate 22 may be adjustably established by providing one or more stops 111 having an elongated slot engageable by a screw 113 threaded into an aperture in cylinder mounting plate 32. The extent of rotation of link 30 about pivotal axis 44 is thereby limited to correspondingly limit the extent of rotation of tailgate 22.

The control mechanism for actuating the latch assemblies 34 and the valve assembly 18 is supported, in part, by means of a pair of plates 120 (Figs. 1 and 2) bolted or otherwise affixed to the vehicle's frame, such as to the channel-section member 14, and in part by a pair of assemblies each comprising a shaft supporting plate 124 affixed to an angle 126 bolted or otherwise secured to the bed 12 of the vehicle. An inner control shaft 130 extends transversely of the vehicle and is rotatably supported in apertures in the plates 120. Each of two outer control shaft sections 122 is coaxially disposed upon and near each end of the inner shaft 130. The shown section 122 terminates at one end at 144 and at the other end at a latch release angle 128 welded or otherwise affixed thereto. Each outer control shaft section 122 is supported in apertures in the plate 124 and angle 126.

Both the inner control shaft 130 and the outer control shaft 122 are actuated by the hand lever assemblies 38. Each hand lever comprises an outer tubular casing 134 rigidly affixed to the inner control shaft 130 by means of a clamp assembly 136. The upper end of the casing passes through an aperture cut in the bed surface 12 and is so located as to be readily accessible to the operator. Rotation of the casing member 136 about the longitudinal axis of the inner control shaft 130 causes a corresponding rotation of the entire inner control shaft 130. This rotation controls the valve assembly 18 in a manner hereinafter to be described.

In order to control latch assemblies 34, an additional motion of the hand lever assembly 38 is required. Thus, the aforesaid rotation of the casing 134 will normally produce no rotation of the outer control shaft 122 since the lever does not normally engage the latch release angle 128. However, a rod 140 is coaxially disposed within the casing 134 and is spring biased upwardly therewithin so that its upper end 142 (or a separate button operatively associated with that upper end) extends above the casing member 134 and its lower end 144 is spaced from the latch release angle 128. In order to actuate the latch assemblies 34, the upper end 142 of the rod 140 is depressed to engage the lower end 144 thereof with a slot or aperture in the latch release angle 128. Subsequent rotation of the hand lever assembly about the longitudinal axis of the inner control shaft 130 will impart rotational motion to the latch release angle 128 and hence to the outer control shaft 122.

A lever 146 is clamped to each of the outer control shaft sections 122 near the inner end 144 (Fig. 1). Lever 146 is connected by means of a link 148 to a lever 150 which is clamped to an auxiliary shaft 152 supported in the mounting plates 120 and extending in spaced parallelism with the inner control shaft 130. In the view of Fig. 1, shaft 152 overlies a portion of the inner control shaft 130 and the inner end portions of the two outer control shaft sections 122, the auxiliary shaft 152 ending just to the left of the lever 150.

As may best be seen in Fig. 2, each of the latch assemblies 34 includes a latch 154 mounted upon the auxiliary shaft 152. A latch release arm 158 is held upon the auxiliary shaft 152 by a clamp assembly 160 in a position to engage a lug 170 extending laterally of the latch 154. The latch 154 is or may be free to rotate upon the auxiliary shaft 152 but is biased downwardly by a spring 164 extending between the latch 154 and a projection 162 on the latch release arm 158, and by a spring 166 connected to the latch 154 and anchored to a spring support 168 mounted upon the plate 120.

With the inner rod 140 of one of the hand lever assemblies 38 depressed so that its lower end 144 engages the aperture in the latch release angle 128, rotation of the hand lever assembly 38 in a counterclockwise direction (Fig. 2) will impart a corresponding counterclockwise rotation to the auxiliary shaft 152 via the previously traced linkage, resulting in a counterclockwise rotation of the latch release arm 158, to force the lug 170, and hence the latch 154, also to rotate in a counterclockwise direction. In this manner, each latch 154 may be released from the latch pin 36 upon the one of the outer arms 24 individual thereto to permit lowering of the tailgate 22.

Rotation of the hand lever assembly 38 in either direction produces corresponding rotation of the inner control shaft 130 whether the rod 140 is in its upper or its lower position. The rotation of shaft 130 is utilized to control the valve assembly 18, the control linkage being presented in an enlarged view in Figs. 5 and 6 of the drawings. The valve body 176 is mounted upon an angle 178 bolted or otherwise affixed to one of the cylinder mounting plates 32. The angle 178 is provided with a medial rib 180 and a laterally extending bar 182 welded or otherwise affixed thereto. Bar 182 supports a cross pin 184 engaging the two legs of a bifurcated lever 186 and serving as the pivot point therefor.

To translate rotational motion of the inner control shaft 130 into rotational motion of the lever 186 about its pivotal axis 184, an arm 188 is affixed to the control shaft 130 by means of a clamp assembly 190. Arm 188 and lever 186 are interlinked by means of a rod 192 pinned to the lever 186 and terminating in a yoke portion 194 pinned to the arm 188. A pin 196, passing through the legs of the lever 186 intermediate the rod 192 and the pivotal axis 184, engages an eye upon the end of the valve spool 198. Consequently, counterclockwise rotation (Fig. 5) of the inner control shaft 130 will cause the lever 186 to rotate in a clockwise direction about its axis of rotation 184 to move the valve spool 198 to the right, and conversely with clockwise rotation of the inner control shaft 130.

To close the tailgate 22, the valve spool 198 must be moved to its outwardmost position. Further, while the equipment is normally arranged so that lowering of the tailgate is normally accomplished by letting the tailgate fall at a controlled rate, means are provided, hereinafter to be described, for moving the tailgate downwardly under power, and this requires the valve spool 198 to be moved to the same position as in closing.

To define an intermediate "float" or non-power lowering position of the valve spool 198, and to reduce the possibility of an operator inadvertently moving the hand lever into the power lowering position, means are provided for offering additional resistance to the motion of that lever prior to the point that the closing or power lowering position of the valve spool 198 is reached. This means includes a spring guide 202 affixed to the lower end of lever 186 by a pin 204 and terminating in a rod portion 206 slidably disposed within an aperture in the rib 180. A spring 208 is disposed upon the spring guide 202 intermediate washers 210 and 212, washer 212 abutting rod portion 206 but being greater in diameter than the aperture through which the rod portion 206 slides. Consequently, over a substantial portion of the entire rotation of the hand lever, spring 208 is ineffective to offer any resistance to that rotation. However, when the hand lever, and hence the inner control shaft 130, is rotated to a position in which washer 212 strikes the face of rib 180, further motion will be impeded by the spring 208 so that the operator will sense the additional load and control his actions accordingly.

Figure 5:
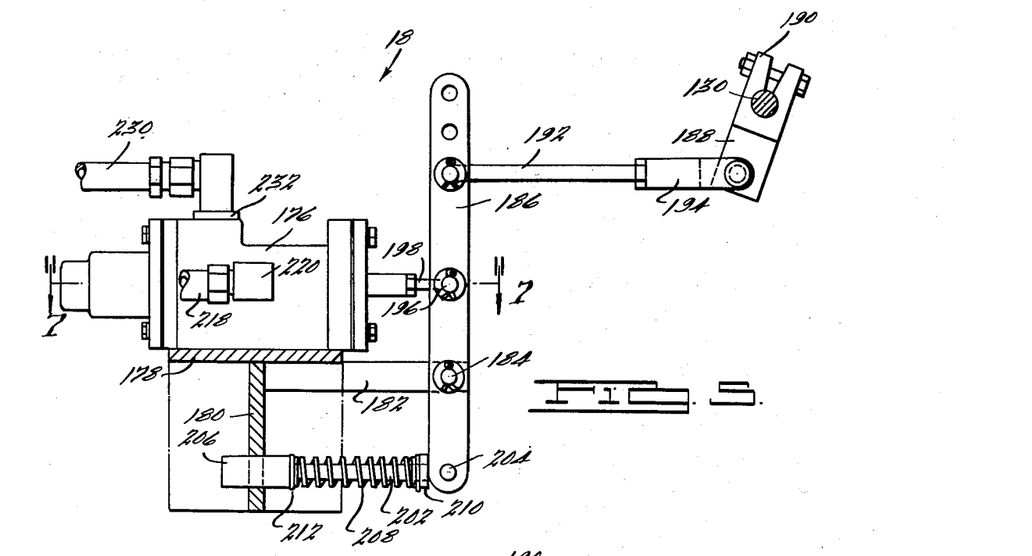
Fig. 5 is a sectional view taken substantially along the line 5—5 of Fig. 1, showing the control valve assembly with certain of its controlling linkages.
Figure 6:
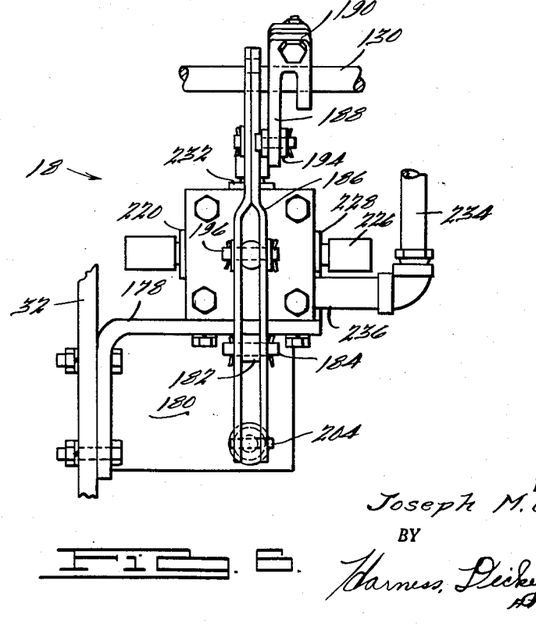
Fig. 6 is an end view of the structure shown in Fig. 5, and is an enlarged representation of a portion of Fig. 1 of the drawings.

As may be seen in Figs. 5 and 6, the valve body 176 is provided with four hydraulic connections. The nature of these connections may be best understood by referring to the hydraulic circuit shown in Fig. 12 in conjunction with the structural representations in Figs. 5 and 6. A hydraulic pump 216 is driven by the vehicle's power plant in any suitable manner, such as by a power take-off. Pump 216 is connected by a hydraulic line 218 to the pump input port 220 on the side of the valve body 176. Pump 216 is also connected by a hydraulic line 222 to a reservoir 224 which is in turn connected by a hydraulic line 226 to a reservoir port 228 on the other side of the valve body 176.

As above noted, the cylinder assembly 20 is provided with a double acting piston terminating in a piston rod 40. The lower end of the cylinder is connected by a hydraulic line 230 to a "raise" port 232 on the upper surface of the valve body 176, and the upper end of the cylinder 20 is connected by a hydraulic line 234 to a "close" port 236 on the side of the hydraulic valve body 176.

Figure 7:
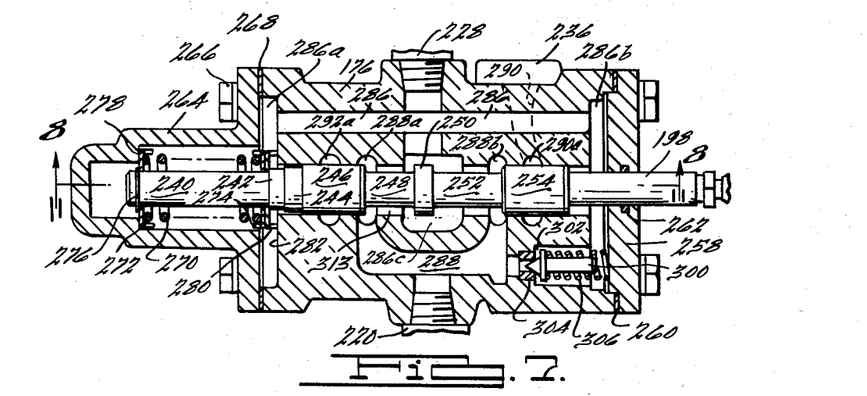
Fig. 7 is a horizontal sectional view of the valve shown in Fig. 5, the section being taken substantially along the line 7—7 thereof, the valve being shown in an idle or neutral position.
Figure 8:
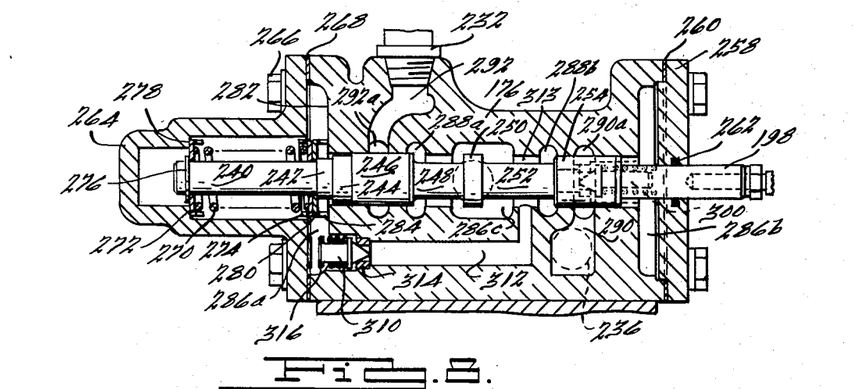
Fig. 8 is a vertical sectional view of the valve shown in Fig. 5 as is indicated by the line 8—8 of Fig. 7.
Figures 10, 12:
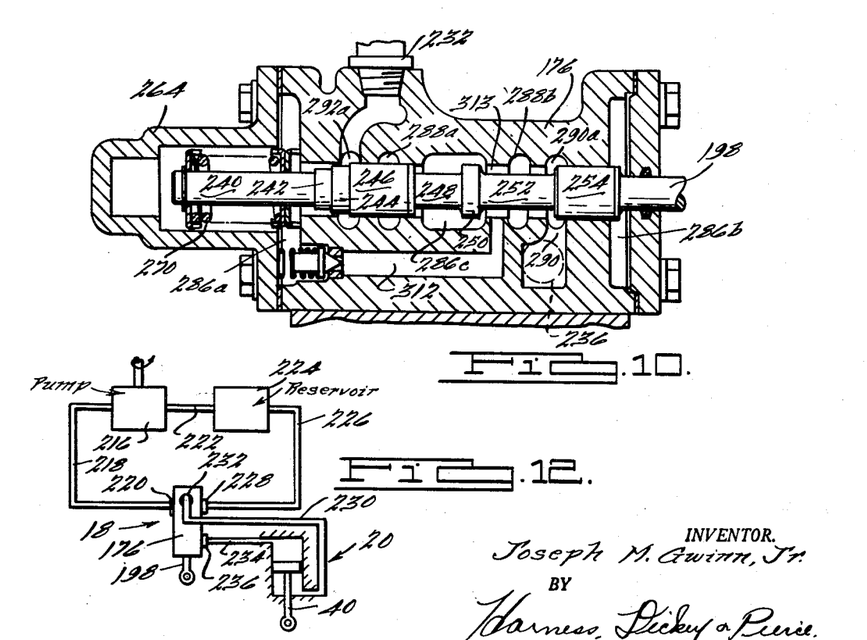
Fig. 10 is a reproduction of the view of Fig. 8 except that the valve spool has been moved to a float position during which the tailgate may descend in a regulated manner from its upper to its lower position as a result of gravitational forces.
Fig. 12 is a schematic representation of the elements of the hydraulic system and of their interconnection.

The internal construction of the valve assembly may be perceived by referring to Figs. 7 and 8 of the drawings, which are horizontal and vertical sections therethrough, respectively. The several connections thereto, as described with reference to Figs. 5, 6 and 12, are similarly identified in Figs. 7 and 8.

The valve body 176 is centrally bored to accept the valve spool 198 comprising elemental portions 240 to 254 of varying, selected diameters, and is otherwise provided with hydraulic-fluid conducting cored passageways, hereinafter to be described. One end of the body portion 176 is capped with an end cover 258, a gasket 260 being interposed those portions. The end cover 258 is centrally apertured to accept the stem of the valve spool 198, a fluid seal in the form of an O ring 262 being provided. At the other end of the valve body 176, a spring housing 264 is attached by machine screws 266 or other suitable fastening means, a gasket 268 being interposed the parts. Spring housing 264 accepts a double-acting compression spring 270 which exerts forces tending to maintain the valve spool 198 in the shown, idle position. Spring 270 is disposed upon spring guide portion 240 of the valve spool 198, abutting spring retainers 272 and 274. Spring retainer 272 abuts a snap ring 276 affixed to the spring guide portion 240 and, further, normally abuts an annular shoulder portion 278 on the inner surface of the spring housing 264. The action of spring 270 also maintains the spring retainer 274 in engagement with a spring stop member 280 which is centrally apertured to accept the spring guide portion 240 of the valve spool 198 but the aperture in which is insufficiently large to pass the portion 242 on that valve spool. Spring stop member 280 also normally abuts face 282 of the valve body 176. Stop member 280 is provided with a plurality of slots 284 around its periphery (Fig. 8) so that it will not impede the flow of hydraulic fluid.

Considering now the cored passageways within the body portion 176 of the valve, the port 228 (Fig. 7) which is connected to the reservoir 224 (Fig. 12) is connected by means of passageways 286 with end chambers 286a and 286b and central chamber 286c. End chambers 286a and 286b are defined by concavities in the ends of the body portion 176 and by the faces of the spring housing 264 and of the end cover 258, respectively.

The port 220 (Fig. 7), which is connected to the pump 216 (Fig. 12), is connected by a passageway 288 to chambers 288a and 288b spaced along the central bore of the body portion 176. Port 236 (Figs. 7 and 8), which is connected to cylinder assembly 20 for causing extension of the piston rod 40 thereof (Fig. 12), is connected by a passageway 290 (Fig. 8) to chamber 290a.

Ports 232 (Fig. 8), which is connected to the other side of the piston of the cylinder assembly 20 for retracting the piston rod 40 (Fig. 12), is connected by a passageway 292 to a chamber 292a.

With the valve spool 198 in the idle position shown in Figs. 7 and 8 of the drawings, the pump pressure is not applied to either side of the piston in the cylinder 20 since chamber 292a is blocked by valve spool portion 246 and since chamber 290a is blocked by spool portion 254. From the standpoint of the cylinder, therefore, this is a closed center position. Since the reduced-diameter portions 248 and 252 are positioned as shown, the pump chambers 288a and 288b are connected to the reservoir chamber 286c so that the apparatus is in an idle condition and the pump is operating under minimum load. As noted, this is the position which the valve will assume in the absence of an otherwise applied mechanical force by an operator.

Figure 9:
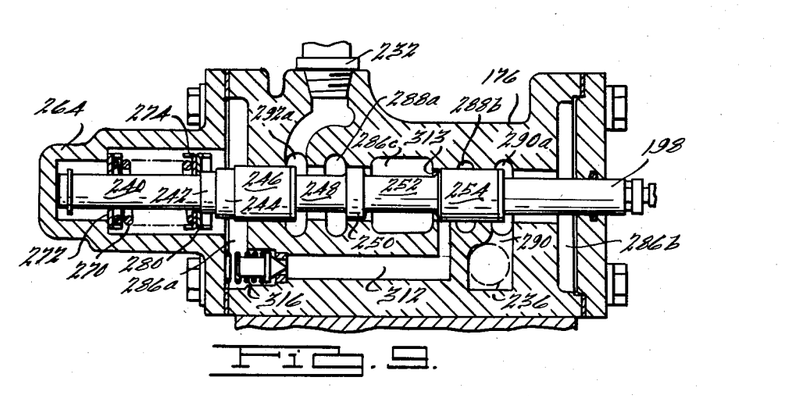
Fig. 9 is a reproduction of the view of Fig. 8 except that the valve spool has been shifted to a position in which the tailgate will either be raised from its lower to its upper position or will be rotated from its closed to its open position in accordance with the instant inter-relationships of certain mechanical elements.

The piston rod 40 of the cylinder assembly 20 must be retracted to raise the tailgate 22 from its lower to its upper position or to rotate the tailgate from its closed to its open position. As is apparent from the showing of Fig. 12, this may be accomplished by connecting the pump 216 to the hose 230 which enters the lower portion of the cylinder assembly and this, in turn, is accomplished by shifting the valve spool 198 from the position shown in Fig. 8 to the position represented in Fig. 9 of the drawings. In this view, the valve spool 198 is shown in a limit position, as defined by engagement of the left-hand end of the spring guide portion 240 with the end of the spring housing 264. In moving the valve spool 198 to this position, spring 270 is compressed since spring retainer 272 cannot move to the left and since spring retainer 274 is forced to the left by the stop member 289 which engages the shoulder between the valve spool portions 240 and 242.

Since the reduced-diameter portion 248 of the valve spool is positioned within chambers 288a and 292a, those chambers are interconnected so that the pump is connected to the port 232 and hence applies pressure to cause the piston rod 40 in the cylinder assembly 20 to be retracted.

Since hydraulic fluid is present in the upper portion of the cylinder 20, provision must be made to permit that fluid to bleed back to the reservoir 224 (Fig. 12). This bleeding action can occur since the enlarged portion 254 of the valve spool 198 is moved sufficiently to the left to establish a direct connection between the chamber 290a, connected to the upper portion of the cylinder assembly 20, and the chamber 286b, which is connected to the reservoir. The pump chamber 288a is blocked from the reservoir chamber 286c by the enlarged portion 250 on the valve spool 198 and the pump chamber 288b is blocked from reservoir chamber 286c by the enlarged portion 254 on the valve spool.

As was previously noted, it is desirable that provision be made so that the tailgate may be lowered from its uppermost position to one in which it is in engagement with the ground or other surface solely as the result of gravitational forces. Assuming the latch assembly 34 to be released, this automatic descent may be accomplished by arranging the valve assembly 18 to effectively interconnect the upper and lower portions of the cylinder assembly 20. However, if a direct interconnection is established, the rate of descent may be too great, particularly where the tailgate is carrying a substantial load. Consequently, it is desirable that the flow of hydraulic fluid be metered so that the rate of movement of the tailgate is regulated. To establish this "float" position, the valve spool 198 is moved to the position represented in Fig. 10 of the drawings, which, from the standpoint of the cylinder, is a metered open-center position. While the valve spool is not at either of its limit positions, the location of the "float" position can be manually sensed by the operator since it is at this point that the spring 208 (Fig. 5) engages the surface of the rib 180 thereby requiring the exertion of an additional force if the valve spool 198 (Fig. 10) is to be moved further to the right. Again, spring 270 is compressed and resists the motion of the valve 198 to the right to the position shown in Fig. 10.

In this position, the pump 216 (Fig. 12) is connected in closed circuit with the reservoir 224 since the reduced diameter portion 252 of the valve spool 198 is so positioned that the pump chamber 288b is connected to the reservoir chamber 286c. Further, the upper portion of the cylinder assembly 20 is connected to the pump 216 and the reservoir 224 since the reduced-diameter portion 252 of the valve spool 198 extends over to include a portion of the "close" chamber 290a. The lower portion of the cylinder assembly 20, connected to the "raise" port 232 and hence to the chamber 292a, is also connected to the reservoir 224 via the reservoir chamber 286a. However, the hydraulic fluid must flow through the relatively narrow annular orifice defined by the side walls of the central bore in the body 176 and the intermediate diameter portion 244 of the valve spool 198. Consequently, as the tailgate lowers, the hydraulic fluid is metered so that the rate of descent of the tailgate is regulated.

Figure 11:
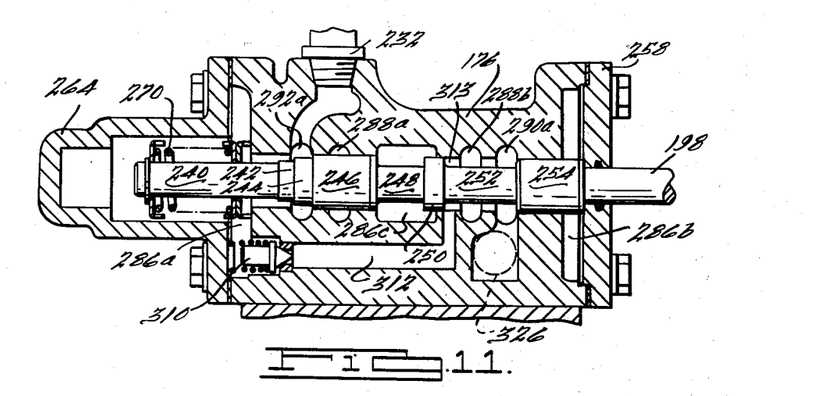
Fig. 11 is a reproduction of the representation of Fig. 8 but with the valve spool moved to still another position in which the tailgate will be rotated from its open to its closed position or in which the tailgate will be hydraulically forced to descend from its upper to its lower position, depending upon the instant inter-relationships of certain other structural elements.

To either close the tailgate or to move the tailgate from its upper to its lower position under power, the valve spool 198 is moved further to the right, against the resistive force exerted by spring 208 (Fig. 5), to its limit position in which the enlarged portion 254 strikes the end cover 258, as is represented in Fig. 11 of the drawings. In this position, the pump chamber 288a is blocked by the enlarged portion 246 of the valve spool 198, and the other pump chamber 288b is not connected with the reservoir 286c due to the interposition of the enlarged portion 250 of the valve spool 198. Since the piston rod 40 must be driven outwardly from the cylinder assembly 20, pressure is applied to the upper end of the piston by connecting the pump chamber 288b to the chamber 290a (Fig. 11). The hydraulic fluid in the lower part of the cylinder assembly 20 is returned to the reservoir 224 (Fig. 12) since the "raise" chamber 292a is connected to the reservoir chamber 286a. It will be noted that the intermediate diameter portion 244 of the valve spool 198 is now moved sufficiently to the right so that this flow is not effectively metered.

Certain safety provisions are made to prevent the equipment from being unduly overloaded, to prevent damage to the load carried by the equipment, and to reduce the possibility of injury to the operator. Thus, if the tailgate is in its lowered position and an attempt is made to raise it with an excessively large load or if the tailgate is closed and an attempt is made to open it but some obstruction exists so that it cannot readily open, the pump and other equipment will be overloaded if preventive means are not provided. This means comprises a pressure relief valve 300 shown in Fig. 7 and represented in phantom in Fig. 8 of the drawings. As may best be seen in Fig. 7, the pressure relief valve 300 is housed in a passageway 302 interjoining the chamber 286b and the passageway 288, the former of which is connected to the reservoir and the latter of which is connected to the pump, as previously described. Valve 300 is biased against its valve seat 304 by means of a pressure relief spring 306 which engages an enlarged shoulder on the valve 300 and abuts the face of the end cover 258 so that the valve is normally closed. If, however, the pressure differential existing between the pump and the reservoir return becomes too great, valve 300 will open to bypass hydraulic fluid until the pressure differential is reduced to the point wherein spring 306 may restore valve 300 to its closed position. Obviously, this pressure relief valve 300 is effective at all times, but serves primarily to prevent overloading during raising of the tailgate or during opening of the tailgate, as noted, i. e., when the lower portion of the cylinder (Fig. 12) is connected to the pump by virtue of the valve-spool position represented in Fig. 9 of the drawings.

A second safety device is adapted to prevent closing of the tailgate if an obstacle obstructs that closing. Thus, if an effort is inadvertently made to close the tailgate when it is laden with articles to be transported, means should be provided to prevent the articles being damaged by being dumped over onto their sides onto the bed of the truck. Further, if a man were to become trapped between the closing tailgate and the end of the truck body, means should be provided to prevent his being crushed or excessively injured. This means comprises a closing release valve 310 (Fig. 8) seated within a passageway 312 interjoining the reservoir chamber 286a and the portion 313 of the central body bore which is connected to the upper end of the cylinder assembly 20 (Fig. 12). Valve 310 is biased into a closed position against its valve seat 314 by a closing relief spring 316 which extends between an enlarged shoulder upon the closing relief valve 310 and the face of the spring housing 264.

Valve 310 produces no useful result during the idle position (Figs. 7 and 8) and the "float" position (Fig. 10) inasmuch as both sides thereof are then connected to the reservoir, and it is rendered ineffectual during the "raise" position (Fig. 9) since passageway 312 is blocked at that time by the enlarged portion 254 of the valve spool 198. However, when the valve spool 198 is in the position represented in Fig. 11 of the drawings, i. e., when the "close" chamber 290a is connected to the "pump" chamber 288b and when both are connected to the passageway 312, valve 310 will open whenever the pressure differential between the upper end of the cylinder assembly 20 (Fig. 12) and the reservoir 224 becomes excessively great. Under this condition, both the closing relief valve 310 and the pressure release valve 306 are capable of responding to the excessive pressures, but the closing relief valve spring 316 is appreciably weaker than the pressure relief valve spring 306 so it is the closing relief valve 310 which exerts the primary control.

It will be recognized that the closing relief valve 310 is also effective to prevent overloading of the equipment when the tailgate is being lowered under power since the position of the valve 18 for this operation is also represented in the showing of Fig. 11. As a result, if the tailgate strikes the ground or some other obstacle during power lowering and the operator fails to release the hand lever, the closing relief valve 310 will open to prevent damage of the equipment. Obviously, pressure release valve 300 will open if for any reason valve 310 fails to open at all or to open adequately.

As an alternative construction, passageway 312 may extend between a reservoir chamber 286a, 286b or 286c and the passageway 290, rather than between the reservoir and the bore portion 313 as shown.

Figure 13:
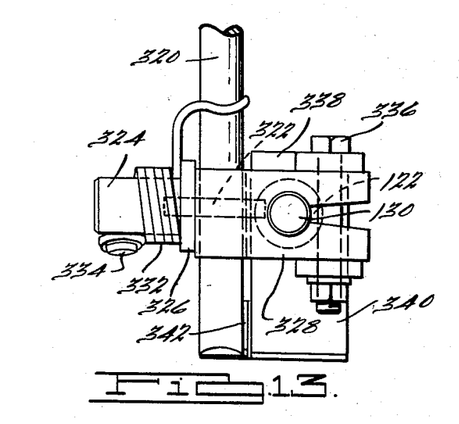
Fig. 13 is a front elevational view of a modified form of control lever.
Figure 14:
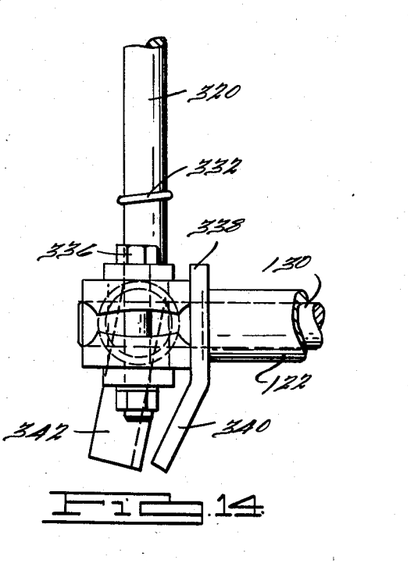
Fig. 14 is a side elevational view of the structure shown in Fig. 13.
Figure 15:
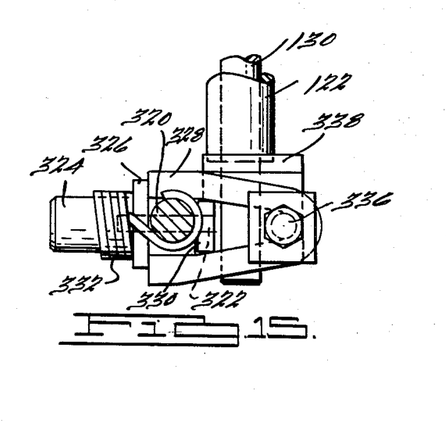
Fig. 15 is a top plan view, partially in section, of the structure shown in Fig. 13.

It will be recalled that in order to control the valve assembly 18, the hand lever assembly 38 must be rotated to rotate the inner control shaft 130. To control the latch assembly 34 not only must the hand lever assembly 38 be rotated but also the inner rod must be depressed so that the lower end thereof 144 engages an aperture in the latch release angle 128 in order that rotary motion may be imparted to the outer control shaft 122. A modified arrangement of hand lever assembly 38 is represented in Figs. 13 to 15 of the drawings. Again, the function of this modified form of hand lever assembly is to rotate the inner control shaft 130 whenever the hand lever itself is rotated and to rotate the outer control shaft 122 only when some action is taken additional to rotation of the hand lever.

In this modified form, it is necessary to pivot the hand lever about an axis which is perpendicular to the longitudinal axis of the control shaft 130 preliminary to rotating it about that longitudinal axis if the outer control shaft 122 is to be rotated. Thus, the hand lever 320, which is shown to be a solid, is transversely apertured to pivotally engage a cross pin 322. One end of pin 322 is inserted in an aperture in a boss 324 provided with a shoulder 326 which is welded or otherwise affixed to the end of the legs of a bifurcated clamp 328. The other end of pin 322 is supported in an aperture in a spacer 330 which extends between the two legs of the bifurcated clamp 328 and is welded or otherwise affixed thereto. The hand lever 322 extends through the channel defined by the inner surface of the two legs of the bifurcated clamp 328, by the inner face of the shoulder 326 on the boss 324 and by the inner surface of the spacer 330. The spacing between the two clamp legs is greater than the diameter of the hand lever 320 so as to permit pivoting of that lever about the axis of the pin 322 through an angle limited by engagement of the lever 320 with the edges of the legs of the clamp 328. One end of a spring 332, mounted upon the boss 324, is wrapped around a pin 334 extending laterally from the boss 324. The other end of spring 332 partially surrounds the hand lever 320 so as to tend to force it to rotate in a clockwise direction (Fig. 14) to its limit position for a purpose hereinafter to be noted.

Clamp 328 is tightly affixed, by means of bolt 336, to the inner control shaft 130. Thus, the hand lever 320 may be rotated about the longitudinal axis of the inner control shaft 130 to correspondingly rotate that control shaft thereby to control the valve assembly 18 in a manner similar to that previously described.

The outer control shaft 122 terminates at and is welded or otherwise affixed to a plate 338 provided with an angularly disposed downwardly extending portion 340. As may best be seen in Fig. 14, the lower end of the hand lever 320 is also angularly disposed with respect to the major longitudinal axis of that lever, and normally lies in spaced proximity to the portion 340 of the plate 338. An angle-iron section 342 is affixed to the lower end of the hand lever 320, the plane of the surface of one of the legs of the angle 342 lying substantially in spaced parallelism with the plane of that edge of the portion 340 which is nearest the hand lever 320, as may best be seen in Fig. 13.

If the hand lever 320 is simply rotated about the longitudinal axis of the inner control shaft 130, the angle iron 342 on the lower end of the hand lever 320 will not engage the portion 340 of the plate 338 and consequently the outer control shaft 122 will not be rotated. However, if it is desired to control the latch assemblies 34 (Fig. 1) by rotating the outer control shaft 122, a moment is first applied to the hand lever 320 to rotate that hand lever about the pivot pin 322 to its limit position in which the angle iron 342 is moved to the right (Fig. 14) to a position adjacent the portion 340 of the plate 338. With the hand lever 320 maintained in this position, subsequent counterclockwise (Fig. 13) rotation of the hand lever 320 about the longitudinal axis of the inner control shaft 130 will bring the angle iron portion 342 into engagement with the portion 340 and thereafter will rotate the portion 340 and hence the outer control shaft 122 about the common longitudinal axes of the inner and outer control shafts.

Thus, as in the case of the first embodiment, the valve assembly may be readily controlled, but release of the latching means 34 can only be accomplished by first rotating the hand lever about a first axis and, secondly, rotating that hand lever about another axis perpendicular to the first axis.

Reverting to a consideration of the general construction of the tailgate assembly, it has apparently been believed that torsional stability adequate to prevent damage or improper functioning when off-center loads are transported could only be obtained by employing two widely spaced, outboard pairs of supporting arms, and, further, by providing rigid interbracing structure between those arms. It has been discovered that torsional rigidity along the longitudinal axis (fore and aft) of the tailgate is not a function of the interarm spacing but of the torsional rigidity of the individual arms. Consequently, in the embodiment of the invention disclosed in Fig. 1 of the drawings, the tailgate is supported by one pair of outboard arms 24 and a single, centrally positioned, unitary arm 26. The torsional rigidity of these arms, and particularly of the center arm 26, is such that the equipment will properly operate even though heavy loads are placed off-center on the tailgate.

While it will be apparent that the embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In an elevating platform assembly, a support structure, a platform movable in translation relative to said support structure between upper and lower positions and rotatable while in the upper position, a first and a second pivot pin on said platform, a first pivot member on said support structure, an arm extending between said first pivot pin and said first pivot member, a second pivot member supported by said support structure and shiftable transversely of the longitudinal axis of said second pivot member between two positions relative to said support structure, a second arm extending between said second pivot pin and said second pivot member driving means for applying a force to one of said arms, means including said driving means for rotating said one of said arms and for holding said second pivot member in one of said positions throughout said rotation so as to move said platform in translation between said upper and lower positions, and means including said driving means and effective when said platform is in said upper position for moving said second pivot member to the other of said positions for rotating said platform.

2. In an elevating platform assembly, a platform, a first and a second pivot pin on said platform, a support structure, a first pivot member fixed on said support structure, an arm extending between said first pivot pin and said first pivot member, a link, means for rotatably supporting one end of said link on said support structure and for preventing translational motion of said one end of said link relative to said support structure, a second pivot member supported by said link, and a second arm extending between said second pivot pin and said second pivot member.

3. In an elevating platform assembly, a platform, a first and a second pivot pin on said platform, a support structure, a first pivot member on said support structure, an arm extending between said first pivot pin and said first pivot member, a link, means for rotatably supporting one end of said link on said support structure and for preventing translational motion of said one end of said link relative to said support structure, a second pivot member supported by said link, a second arm extending between said second pivot pin and said second pivot member, means fixing a limit position to the rotation of said link in one direction, and means for applying forces to rotate said second arm about said second pivot member and to hold said link in its said limit position.

4. In an elevating platform assembly, a support structure, a platform, a pivot member, means including said support structure for pivotally supporting said pivot member, a pair of arms supporting said platform, one of said arms being rotatable about said pivot member, means including the support structure for rotating said arms between an upper and a lower position for moving said platform substantially in translation relative to said support structure, means effective during said translational motion of said platform for preventing motion of said pivot member transversely of its longitudinal axis, and means effective when said arms are in their upper position for bodily moving said pivot member transversely of its longitudinal axis for rotating said platform.

5. In an elevating platform assembly, a platform, a first and a second pivot pin on said platform, a support structure, a first pivot member on said support structure, an arm extending between said first pivot pin and said first pivot member, a link pivotally mounted on said support structure, a second pivot member supported by said link, a second arm extending between said second pivot pin and said second pivot member, means fixing a limit position to the rotation of said link in one direction, means for applying forces to rotate said first arm about said first pivot member, to rotate said second arm about said second pivot member and to hold said link in its said limit position, means fixing a limit position to the rotation of said first arm, and means effective when said first arm is in its said limit position for rotating said link.

6. In an elevating platform assembly, a platform, an upper and a lower pivot pin on said platform, a support structure, an upper pivot member on said support structure, a rigid arm extending between said upper pivot pin and said upper pivot member, a stud on said support structure above said upper pivot member and fixed against translational motion relative to said support structure, a link rotatively mounted on said stud, a lower pivot member below the said upper pivot member and supported on said link, and a rigid arm extending between said lower pivot pin and said lower pivot member.

7. In an elevating platform assembly, a platform, hydraulic means for moving said platform, latch means for controlling the motion of said platform, a first control shaft rotatable to control said hydraulic means, a second control shaft rotatable to control said latch means, a lever rotatable about the longitudinal axis of said first shaft for rotating said first shaft, a plate affixed to said second shaft and adapted to rotate said second shaft, an angularly disposed projection on said plate lying in spaced proximity to said lever, and an end element on said lever selectively engageable with said projection for selectively imparting rotational motion of said lever to said plate.

8. In an elevating platform assembly, a platform, hydraulic means for moving said platform, latch means for controlling the motion of said platform, a first control shaft rotatable to control said hydraulic means, a second control shaft rotatable to control said latch means, a lever rotatable about the longitudinal axis of said first shaft for rotating said first shaft, a plate affixed to said second shaft and adapted to rotate said second shaft, an angularly disposed projection on said plate lying in spaced proximity to said lever, and a rod centrally disposed within said lever and movable longitudinally thereof to engage said projection for selectively imparting rotational motion of said lever to said plate.

9. In an elevating platform assembly, a platform, hydraulic means for moving said platform, latch means for controlling the motion of said platform, a first control shaft rotatable to control said hydraulic means, a second control shaft rotatable to control said latch means, a pin fixed relative to and extending laterally of said first shaft, a lever pivotally mounted on said pin, a plate affixed to said second shaft, and an end element on said lever lying in spaced proximity to said plate, said lever being rotatable about said pin to bring said end element into position to engage said plate and being then rotatable about the longitudinal axis of said first shaft to move said plate.

10. In an elevating platform assembly, a platform, hydraulic means for moving said platform, latch means for controlling the motion of said platform, a first control shaft rotatable to control said hydraulic means, a second control shaft rotatable to control said latch means, said shafts being coaxially disposed, a pin fixed relative to and extending laterally of said first shaft, a lever pivotally mounted on said pin, said lever being rotatable about the axis of said shafts to rotate said first shaft, a plate affixed to said second shaft, an end element on said lever lying in spaced proximity to said plate, said lever being rotatable about said pin to bring said end element into position to engage said plate and being then rotatable about the longitudinal axis of said first shaft to rotate said plate and said second shaft, and means tending to rotate said lever about said pin in a direction to separate said end element from said plate.

11. In an elevating platform assembly, a platform, hydraulic means for moving said platform, and valve means for controlling said hydraulic means comprising a valve body having a central bore, a valve spool slidably disposed in said bore, a first end member affixed to said body and engageable by a portion of said spool for defining one limit position of said spool, a second end member affixed to said body and engageable by a portion of said spool for defining another limit position of said spool, double-acting spring means acting between said spool and one of said end members for forcing said spool to a first intermediate position, and additional spring means which becomes effective upon completion of movement of said spool from said first intermediate position to a second intermediate position, thereby to establish said second intermediate position.

12. In an elevating platform assembly, a platform, hydraulic means for moving said platform, and valve means for controlling said hydraulic means comprising a valve body having a central bore, a valve spool slidably disposed in said bore and having an end portion extending beyond said body, a pivotable actuating lever connected to said end portion, means for pivoting said lever to slide said spool in said bore, a support member having an aperture therein, a rod connected to said lever and slidably engaging said aperture, and spring means on said rod engaging said support member only when said spool has been moved to a preselected position by said lever.

13. In an elevating platform assembly, a platform movable upwardly and downwardly, pump means for establishing hydraulic pressure differentials, a hydraulic cylinder including a double-acting piston connected to said platform for controlling the upward and downward movement of said platform, load means including said platform tending to move downwardly for exerting a force tending to move said piston in one direction in said cylinder, a hydraulic valve having a first and a second position, means effective when said valve is in said first position for connecting said pump to said cylinder for forcing said piston to move in said one direction in said cylinder for forcing said platform to move downwardly, and means effective when said valve is in said second position for permitting said piston to be moved at a controlled rate in said one direction in said cylinder by said load means for permitting said platform to move downwardly at a controlled rate in response to the force exerted by said load means.

14. In an elevating platform assembly, a platform, a first and a second pivot pin on said platform, a support structure, a first pivot member on said support structure, an arm extending between said first pivot pin and said first pivot member, a link pivotally mounted on said support structure, a second pivot member supported by said link, a second arm extending between said second pivot pin and said second pivot member, means fixing a limit position to the rotation of said link in one direction, means for applying forces to rotate said first arm about said first pivot member, to rotate said second arm about said second pivot member and to hold said link in its said limit position, means fixing a limit position to the rotation of said first arm, means effective when said first arm is in its said limit position for rotating said link in a second direction opposite to said one direction, and stop means defining a limit position to the rotation of said link in said second direction.

15. In an elevating platform assembly adapted to be associated with vehicular body frames of various widths, a pair of apertured mounting plates mountable upon the said frames and spaced apart a variable distance determined by the configuration of said frames, a platform assembly, and a support member extending transversely of the vehicle for supporting said platform assembly, said support member slidably engaging the apertures in and capable of being firmly secured to said mounting plates.

16. In an elevating platform assembly adapted to be associated with vehicular body frames of various widths, a pair of apertured mounting plates mountable upon the said frames and spaced apart a variable distance determined by the configuration of said frames, a platform assembly, a support member extending transversely of the vehicle for supporting said platform assembly, said support member slidably engaging the apertures in and capable of being firmly secured to said mounting plates, and key means affixed to said support member and slidably engaging slots in said mounting plates.

17. In an elevating platform assembly for association with a vehicle having a horizontal bed disposed above ground level, a platform, a support structure supported on the vehicle, a centrally disposed unitary arm pivotally connected to said platform and to said support structure, a pair of arms pivotally connected to said platform and to said support structure, the two arms constituting said pair of arms being spaced laterally from and positioned on opposite sides of said centrally disposed arm, the three arms forming a parallel linkage, hydraulic means acting on said central arm for rotating said arms to move said platform effectively in translation between a position proximate ground level and a horizontal position aligned with the bed, and means including said hydraulic means and effective after said platform has been raised to the latter position for shifting the position of said central arm relative to said pair of arms to rotate said platform to a vertical position proximate the bed.

18. In an elevating platform assembly, a platform, a support structure, a centrally disposed unitary arm connected to said platform, a shiftable pivotal connection between said arm and said support structure, and a pair of arms connected to said platform and said support structure, the two arms constituting said pair of arms being positioned on opposite sides of said centrally disposed arm.

19. In an elevating platform assembly, a support structure, a platform movable in translation relative to said support structure between upper and lower positions and rotatable while in the upper position, a first and a second pivot pin on said platform, a first pivot member on said support structure, an arm extending between said first pivot pin and said first pivot member, a second pivot member supported by said support structure and shiftable transversely of the longitudinal axis of said second pivot member between two positions relative to said support structure, a second arm extending between said second pivot pin and said second pivot member, driving means for applying a force to one of said arms, means including said driving means for rotating said one of said arms and for holding said second pivot member in one of said positions throughout said rotation so as to move said platform in translation between said upper and lower positions, selectively effective latch means for holding said platform in said upper position, and means including said driving means and said latching means for moving said second pivot member to the other of said positions for rotating said platform.

References Cited in the file of this patent

UNITED STATES PATENTS

| | | |
|---|---|---|
| 1,912,184 | Ferris et al. | May 30, 1933 |
| 1,929,112 | Hansen | Oct. 3, 1933 |
| 1,974,657 | Rodler | Sept. 25, 1934 |
| 2,103,984 | Indge | Dec. 28, 1937 |
| 2,240,723 | Stoehr | May 6, 1941 |
| 2,286,537 | Gorsuch | June 16, 1942 |
| 2,320,600 | Howell | June 1, 1943 |
| 2,458,290 | Monroe | Jan. 4, 1949 |
| 2,509,589 | Deardorff et al. | May 30, 1950 |
| 2,534,525 | Molloy | Dec. 19, 1950 |
| 2,590,591 | Winkler | Mar. 25, 1952 |
| 2,626,067 | Berford et al. | Jan. 20, 1953 |
| 2,654,491 | Duis et al. | Oct. 6, 1953 |
| 2,683,545 | Wood | July 13, 1954 |
| 2,684,770 | Park | July 27, 1954 |
| 2,751,932 | Stueland | June 26, 1956 |